(12) United States Patent
Ando (10) Patent No.: US 7,808,714 B2
(45) Date of Patent: Oct. 5, 2010

(54) IMAGE PROVIDING APPARATUS

(75) Inventor: Takahisa Ando, Ikoma (JP)

(73) Assignee: Sanyo Electric Co., Ltd. (JP)

( * ) Notice: Subject to any disclaimer, the term of this patent is extended or adjusted under 35 U.S.C. 154(b) by 873 days.

(21) Appl. No.: 11/723,009

(22) Filed: Mar. 15, 2007

(65) Prior Publication Data
US 2007/0217001 A1    Sep. 20, 2007

(30) Foreign Application Priority Data
Mar. 16, 2006   (JP) .............................. 2006-072162

(51) Int. Cl.
*G02B 27/14*    (2006.01)
*G02F 1/1335*   (2006.01)
*G09G 5/00*     (2006.01)

(52) U.S. Cl. .............................. 359/630; 349/11; 345/8
(58) Field of Classification Search ................. 359/630, 359/631, 632, 633; 349/11; 345/8
See application file for complete search history.

(56) References Cited

U.S. PATENT DOCUMENTS 6,034,653 A * 3/2000 Robertson et al. .............. 345/8
6,680,802 B1 * 1/2004 Ichikawa et al. ............. 359/630
7,410,255 B2 * 8/2008 Nakazawa et al. .......... 351/158

FOREIGN PATENT DOCUMENTS

JP    2005-055560    3/2005

* cited by examiner

*Primary Examiner*—David N Spector
(74) *Attorney, Agent, or Firm*—NDQ&M Watchstone LLP (57) ABSTRACT

Provided is an image providing apparatus having connecting member connecting a head set and optical housing capable of adjusting displacement of the optical housing in the vertical direction to the eyeball of the observer when adjusting the eye-relief of the optical housing to the eyeball of the observer. The ball joint has ball portions respectively on two ends thereof, on one of the ends (upper ends) is provided to the supporting member side capable of maintaining a posture thereof, and the ball portion on another ends (lower ends) is provided to the optical housing side for maintaining a posture thereof. The connecting member has a first member and a second member, the first member is connected to the second member so as to be movable and capable of maintaining a posture thereof.

12 Claims, 12 Drawing Sheets

PLAN VIEW

FIG. 3B

SIDE VIEW

IMAGE PROVIDING APPARATUS

CROSS REFERENCE TO RELATED APPLICATIONS

This application claims priority based on 35 USC 119 from prior Japanese Patent Application No. P2006-072162 filed on Mar. 16, 2006, entire contents of which are incorporated herein by reference.

BACKGROUND OF THE INVENTION

1. Field of the Invention

The present invention relates to an image providing apparatus for allowing an observer to observe images.

2. Description of Related Art

Figure 12A:
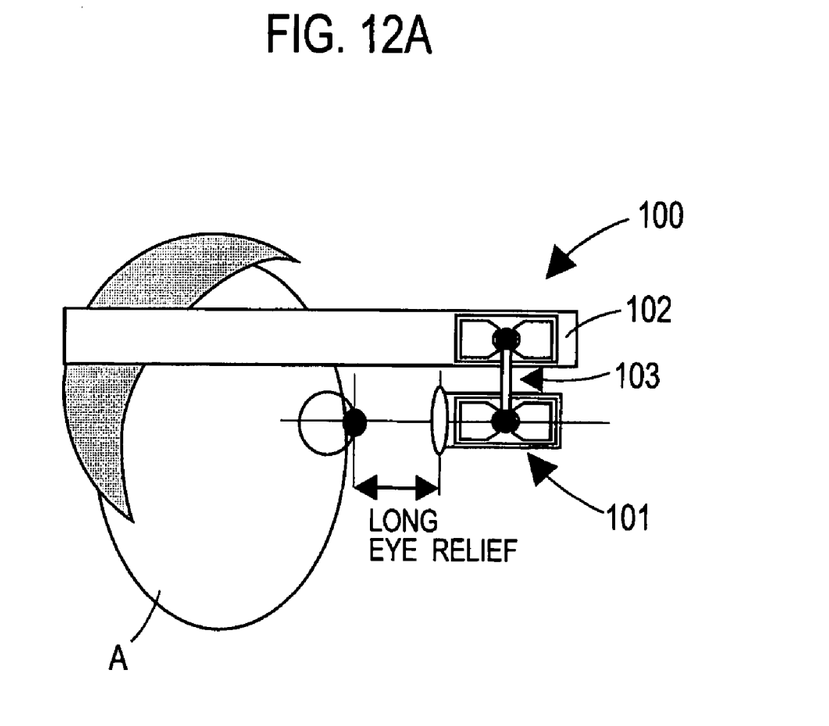
FIG. 12A is an explanatory view showing a conventional image providing apparatus, and illustrating a relationship between displacement of a ball joint and eye relief adjustment.
Figure 12B:
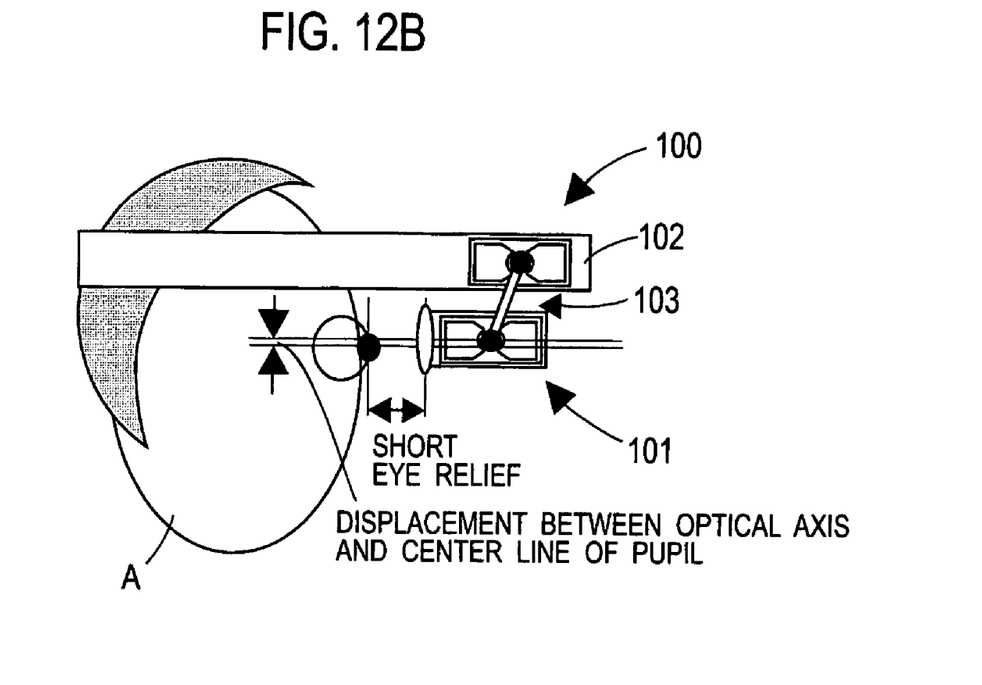
FIG. 12B is a second explanatory view showing the conventional image providing apparatus, and illustrating the relationship between displacement of the ball joint and eye relief adjustment.

Heretofore disclosed is an image providing apparatus which allows an observer to observe an image by a Maxwellian view by focusing image light obtained by modulation with a spatial-light modulation element, on the center of a pupil of the observer. FIG. 12A and FIG. 12B show a state of an observer A wearing a conventional image providing apparatus 100.

Figure 13A:
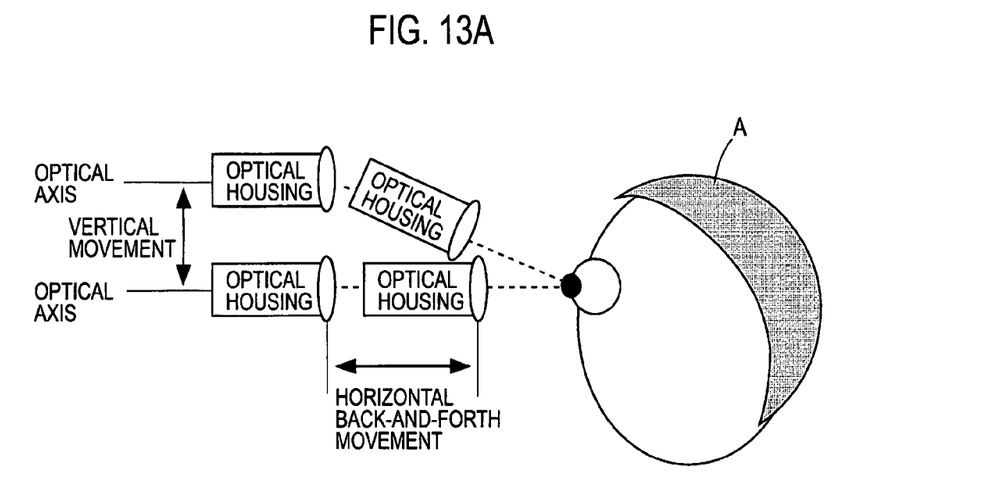
FIG. 13A is a view for explaining movements (postures) required in an optical housing.
Figure 13B:
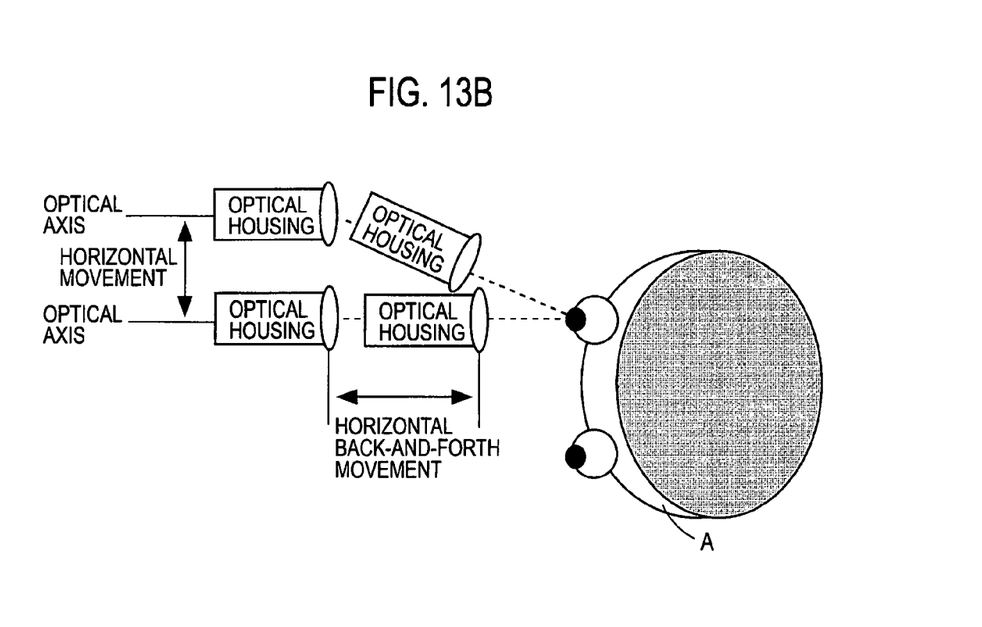
FIG. 13B is a second view for explaining movements (the postures) required in the optical housing.

As disclosed in Japanese Patent Application Laid-open Publication No. 2005-55560, an optical housing 101 is connected to a head gear 102 by use of a ball joint 103. The positions of the optical housing 101 and the head gear 102 can be changed relative to each other by use of the ball joint 103. In this image providing apparatus, as shown in FIG. 13A and FIG. 13B, it is easy to move the optical axis of the optical housing 101 vertically and horizontally with respect to the center line of a pupil of an observer A, to move the optical housing 101 closer to, or away from an eyeball of the observer A (adjustment for a length of an eye relief), and to tilt (to turn) the optical housing 101.

However, in the case of the conventional image providing apparatus, the central position of the optical axis of the optical housing 101 is displaced vertically when the length of the eye relief is adjusted. For example, when the optical housing 101 is moved closer to the eye of the observer A as shown in FIG. 12B, the central position of the optical axis of the optical housing is displaced upward. In this case, it is possible to align the center of the optical axis with the center of the pupil of the observer A by shifting a nose pad (not shown) of the head gear 102 upward with respect to the head gear 102 and thereby displacing the optical housing 101 downward. However, it is troublesome to adjust the nose pad each time.

SUMMARY OF THE INVENTION

To solve the problem, an image providing apparatus of the present invention is formed of an optical housing which houses an image providing optical system for providing an image to an observer, a head gear which is fitted to a head of the observer, a supporting member provided to the head gear, and a connecting member which connects the optical housing to the lower side of the supporting member. Here, the connecting member is a rod member each ends of which is provided with a boll portion, and thus has a conical-movable range. The ball portion on one of the ends is provided as being capable of maintaining the posture thereof on the supporting member side, and the ball portion on the other end is provided as being capable of maintaining the posture thereof on the optical housing side. The rod member includes a first bent member and a second bent member respectively having bent shapes, and the first bent member is connected to the second bent member so as to be movable and capable of maintaining the posture of the rod member.

DETAILED DESCRIPTION OF EMBODIMENTS

Now, embodiments of the present invention will be described with reference to the accompanying drawings. It is to be noted that the same or similar constituents are designated by the same reference numerals, and that duplicate explanations will be omitted therein.

Figure 1:
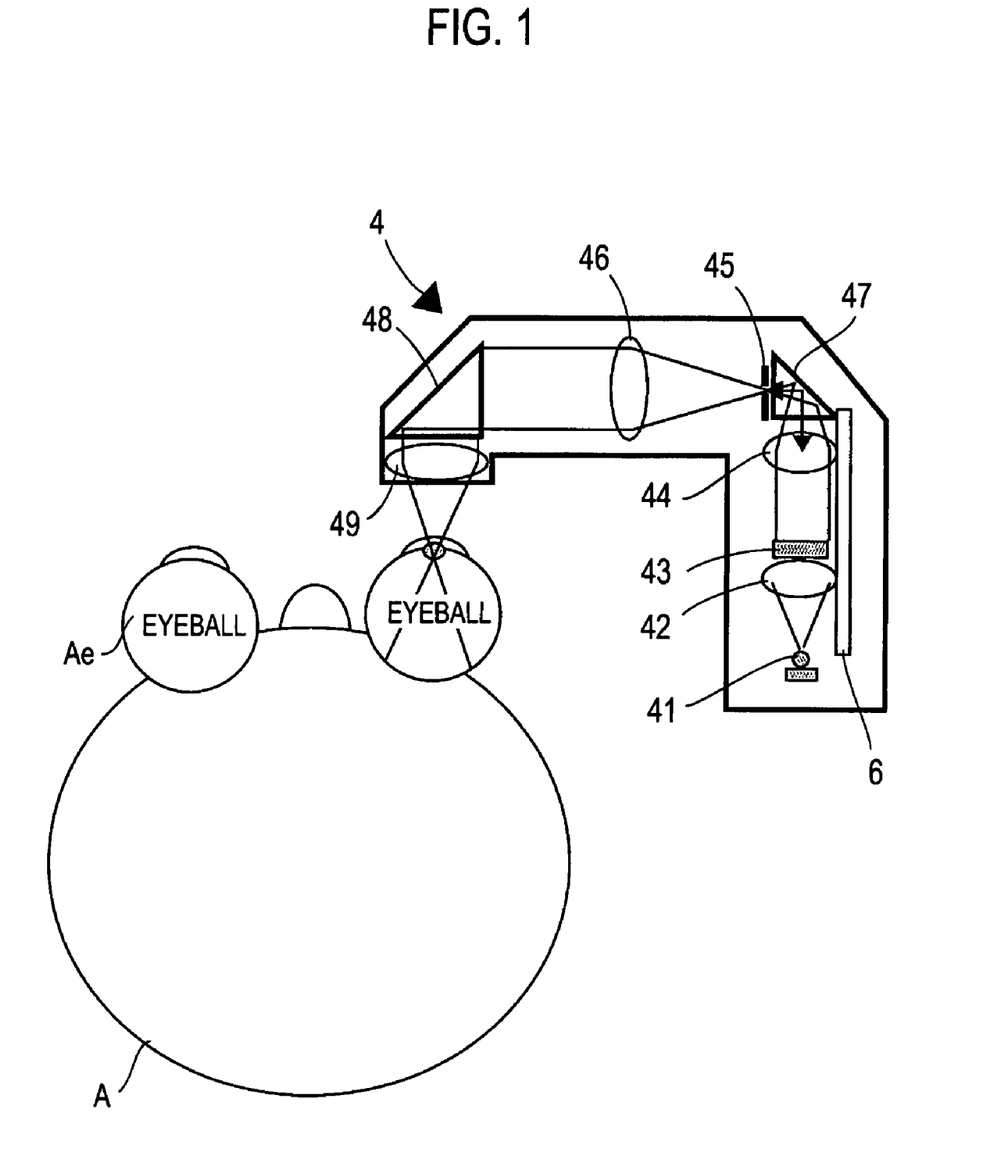
FIG. 1 is an explanatory view showing an example of an optical housing in an image providing apparatus according to an embodiment, as well as showing a way of guiding image light to an eyeball.

An image providing apparatus of this embodiment includes an optical housing which incorporates a light source and an optical system for focusing image light. FIG. 1 shows a layout example of optical members in an optical housing 4. This optical housing 4 focuses image light onto an eyeball Ae of an observer A by changing twice the optical path of an outgoing beam emitted from a light source located on the rear end of the optical housing 4. The optical housing 4 includes, for example, a chip-type (non-molded) light emitting diode (LED) 41 as the light source. The LED 41 is located in a focal position of a collimator lens 42, and the outgoing beam from the LED 41 is formed into a parallel ray by the collimator lens 42. The image light obtained by causing this parallel ray to transmit through a liquid crystal display panel (a spatial-light modulation element) 43 is guided to a double refraction optical system. The double refraction optical system includes a lens 44, a pin hole 45 and a lens 46. The lens 44 and the lens 46 are placed apart from each other at a distance equivalent to the sum of focal lengths of the respective two lenses, and the image light is caused to pass through the pin hole 45 in a focal position of light beams. Moreover, a mirror 47 is disposed inside the double refraction optical system in order to change the optical path by 90°. The image light, which has passed through the double refraction optical system is guided to a condenser lens (an eyepiece optical system) 49 through a mirror 48 for further changing the optical path by 90°. This configuration makes it possible to locate a conjugate point of the pin hole 45 along the center of the pupil of the eyeball Ae, and thereby to provide the observer A with a wide field of view. In addition, the optical housing 4 is provided with a circuit board 6 for driving the liquid crystal display panel 43.

Power-supplying lines and image-signal-supplying lines are connected to the circuit board 6. Image signals from a CCD camera, a television and the like are supplied to the image signal supply lines.

Figure 2:
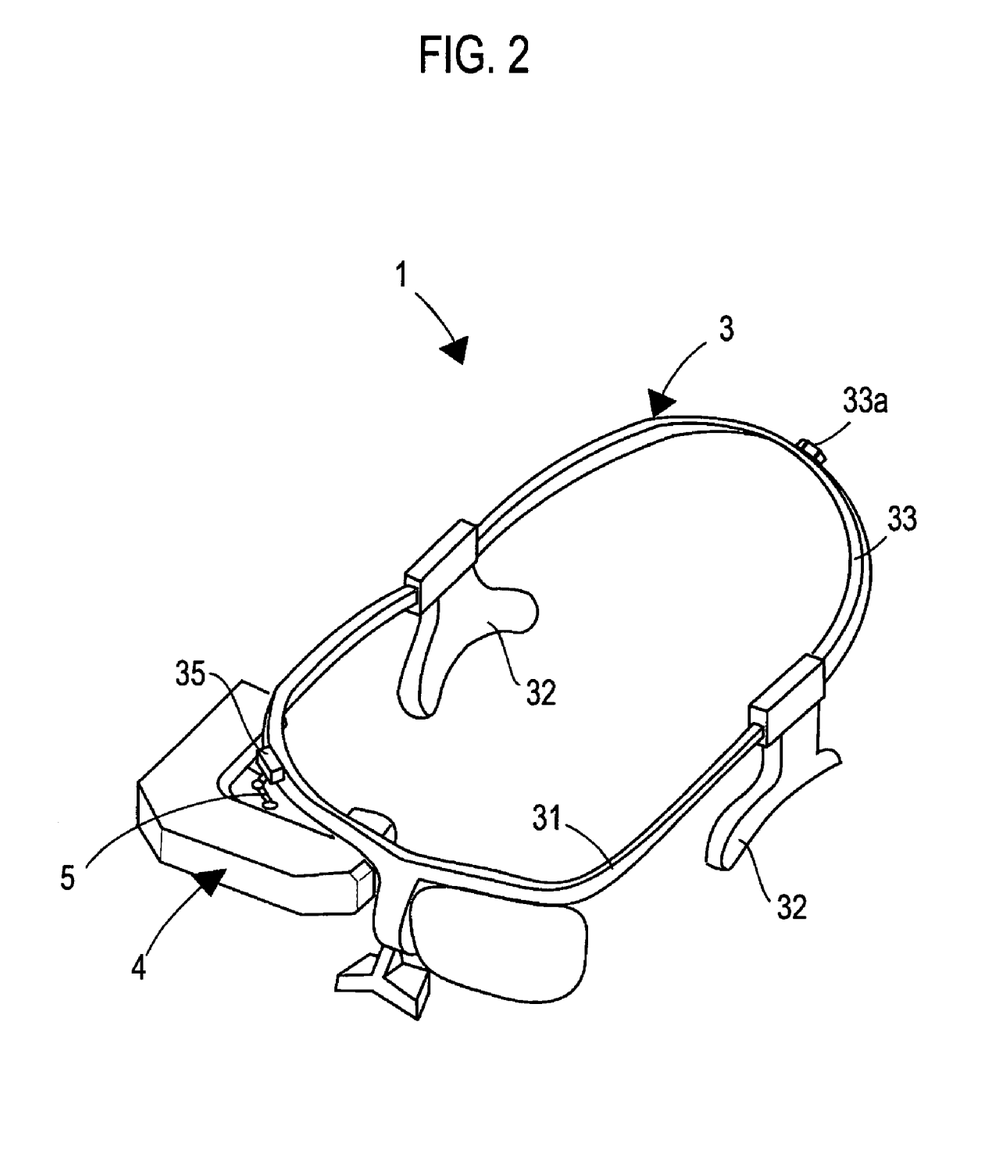
FIG. 2 is a perspective view of the image providing apparatus of the embodiment.
Figure 3A:
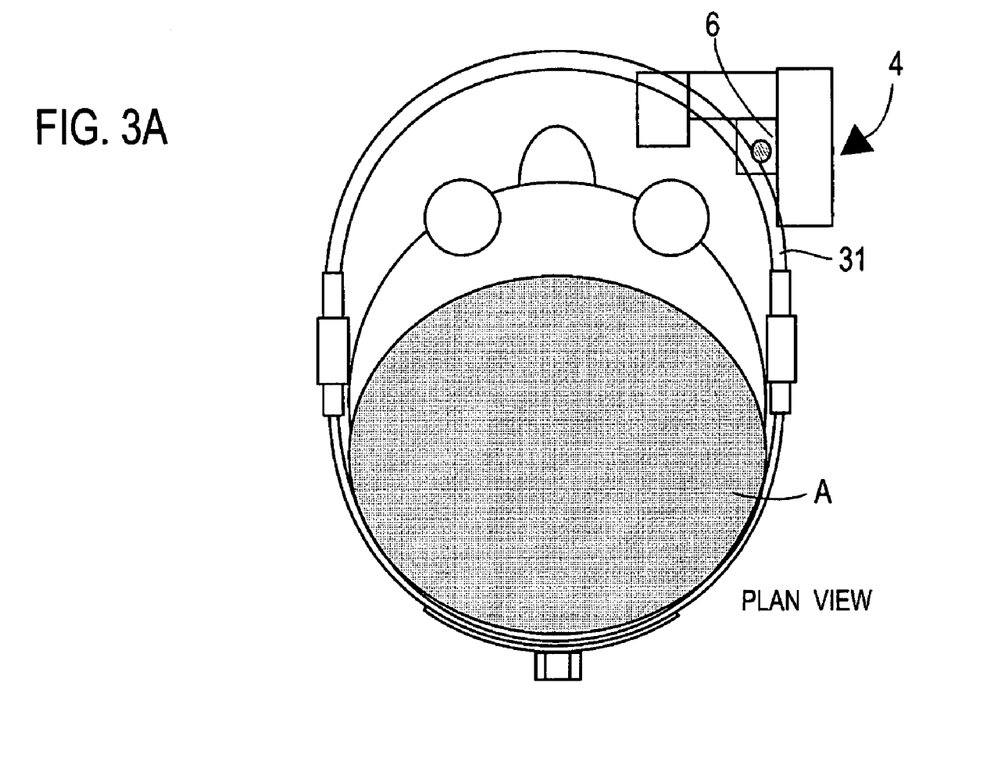
FIG. 3A is a plan view showing a state where the image providing apparatus of the embodiment is fitted.
Figure 3B:
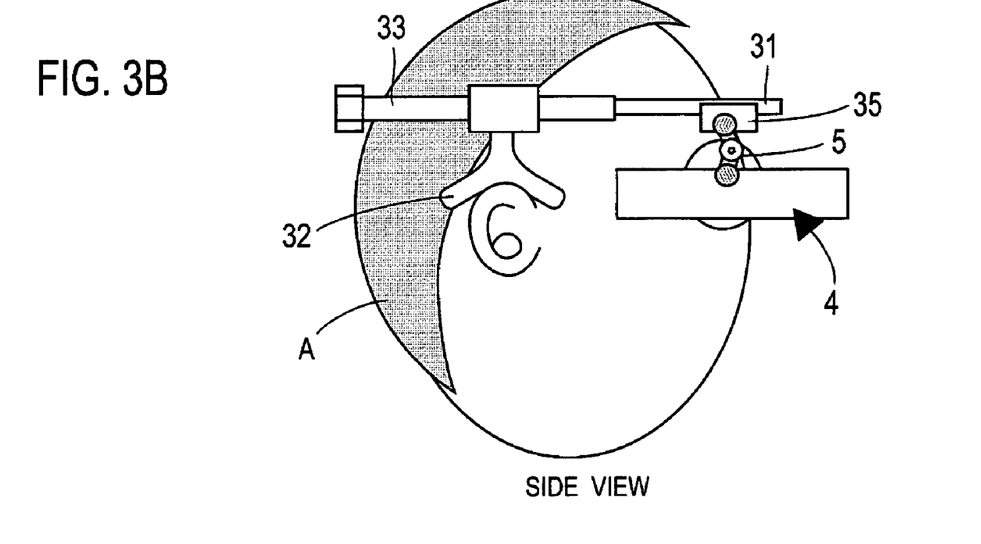
FIG. 3B is a side view showing the state where the image providing apparatus of the embodiment is fitted.

FIG. 2 is a perspective view showing the image providing apparatus 1. FIG. 3A is a plan view showing a state where the image providing apparatus 1 is fitted, and FIG. 3B is a side view showing the state where the image providing apparatus 1 is fitted. The image providing apparatus 1 has a structure in which the optical housing 4 is fitted to a headset (a head gear) 3. The headset 3 includes a supporting member 31 located in a position corresponding to a frontal region of the head of the observer A, earpieces 32 to be placed on the ears of the observer A, and an adjuster 33 located in a position corresponding to an occipital region of the head of the observer A. Adjustment for fitting the apparatus to the size of the head of the observer A can be achieved by turning an adjusting knob 33a provided to the adjuster 33.

Figures 4A, 4B, 4C, 4D:
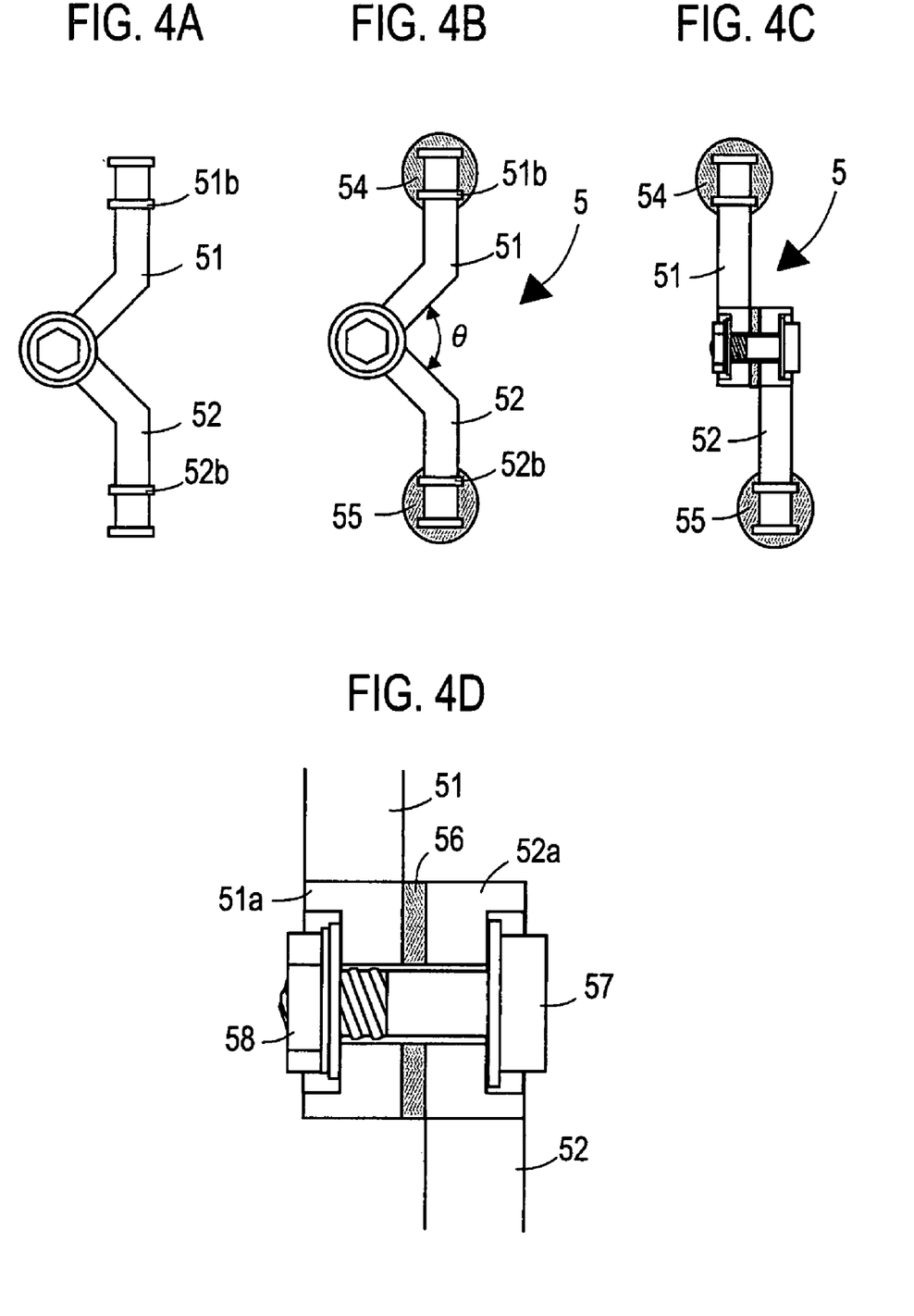
FIG. 4A is a front view showing a ball joint (showing a state with rubber balls that constitute ball portions being removed).
FIG. 4B is a second front view showing the ball joint (showing a state where the rubber balls constituting the ball portions is fitted, and illustrating cross sections of the rubber balls).
FIG. 4C is a side view showing the ball joint (showing cross sections of connecting portions).
FIG. 4D is an enlarged cross-sectional view showing the connecting portions of the ball joint.

The optical housing 4 is supported at the lower part of the supporting member 31 with a ball joint (a connecting member) 5 so as to retain a conical-movable range. FIGS. 4A, 4B, 4C and 4D each show the ball joint 5. As shown in FIGS. 4B and 4C, the ball joint 5 is a rod member ends of which respectively include ball portions 54 and 55. Here, the ball portion 54 on a first end (the upper end) of the rod member is fitted to the supporting member 31 as being capable of maintaining a posture thereof, and the ball portion 55 on a second end (the lower end) of the rod member is fitted to the optical housing 4 as being capable of maintaining the posture thereof. The posture can be maintained by setting friction (pressure) between surfaces of the ball portions 54 and 55, and between surfaces of containers for the ball portions, which surfaces are in contact with each other. Alternatively, it is also possible to maintain the posture by providing the containers with spring members, or with a magnetic force provided by forming the ball joint with a magnetic material, and by locating magnets in the containers, for example. The ball portions 54 and 55 in this embodiment may contain, as a major ingredient, an elastic body such as urethane rubber (having hardness preferably set in a range from about 60 degrees to 90 degrees).

The rod member includes a first bent member 51 and a second bent member 52 respectively having bent shapes. The first bent member 51 is connected to the second bent member 52 so as to be movable and capable of maintaining the posture thereof. Specifically, as show in FIG. 4D, the first bent member 51 and the second bent member 52 respectively include connecting portions 51a and 52a in a circular plate shape, on one ends thereof. Moreover, these connecting portions 51a and 52a are connected to each other with a rubber plate 56 interposed therebetween by pressure using a bolt 57 and a nut 58. The bolt 57 defines the rotational axis of the connecting portions 51a and 52a, and the direction of this rotational axis is substantially perpendicular to the direction of the optical axis of the optical housing 4. Preferably, the rubber plate 56 is made of urethane rubber as a major ingredient which has hardness in a range from about 60 degrees to 90 degrees. By connecting the first bent member 51 to the second bent member 52 as described above, it is made possible to change an angle (θ) defined by the first bent member 51 and the second bent member 52 as shown in FIG. 4B. Furthermore, it is made possible to adjust a distance between the ball portion 54 and the ball portion 55 by adjusting this angle.

As shown in FIG. 4A, the first bent member 51 and the second bent member 52 respectively include fastening rims 51b and 52b on the other ends thereof. The ball portions 54 and 55 are formed in a spherical shape in positions where the faster rims 51b and 52b are formed.

Figure 5A:
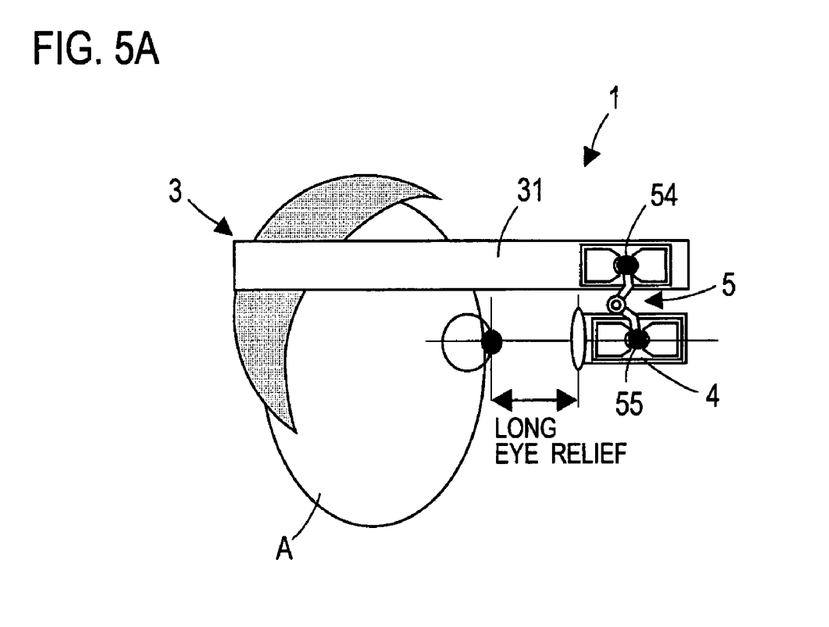
FIG. 5A is an explanatory view showing a state where the image providing apparatus of the embodiment is fitted, and illustrating a relationship between displacement of the ball joint and eye relief adjustment.
Figure 5B:
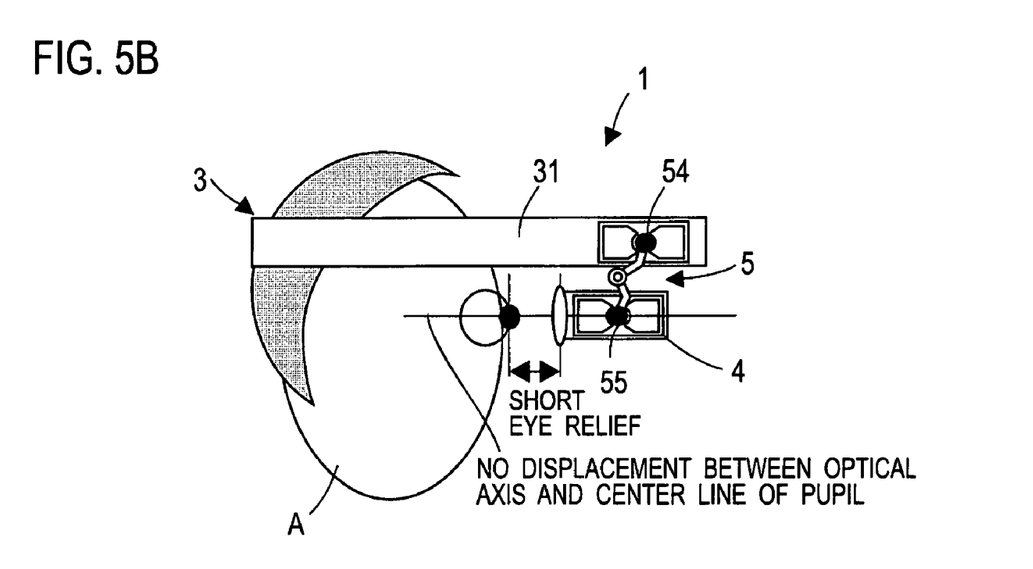
FIG. 5B is a second explanatory view showing the state where the image providing apparatus of the embodiment is fitted, and illustrating the relationship between displacement of the ball joint and eye relief adjustment.
Figure 6A:
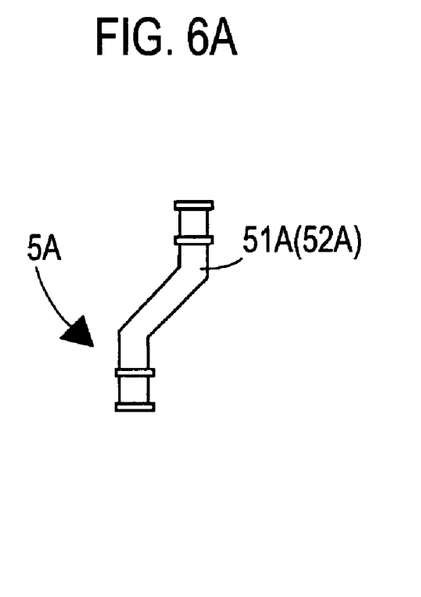
FIG. 6A is a front view showing a second example of the ball joint, and illustrating a bent portion constituting part of the ball joint (showing a state with the rubber balls constituting the ball portions being removed).
Figure 6B:
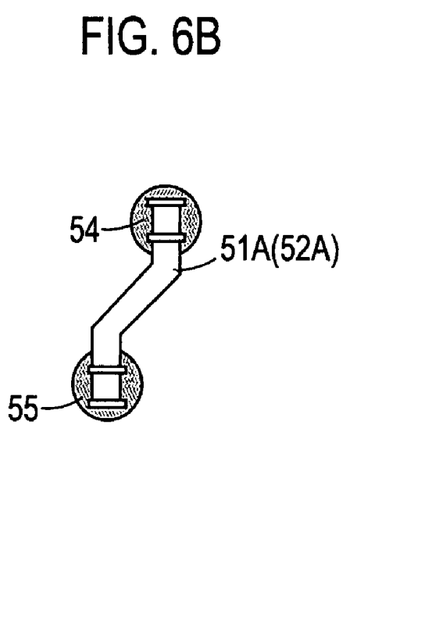
FIG. 6B is another front view showing the second example of the ball joint, and illustrating the bent portion constituting part of the ball joint (showing a state where the rubber balls constituting the ball portions is fitted, and illustrating cross sections of the rubber balls).
Figure 6C:
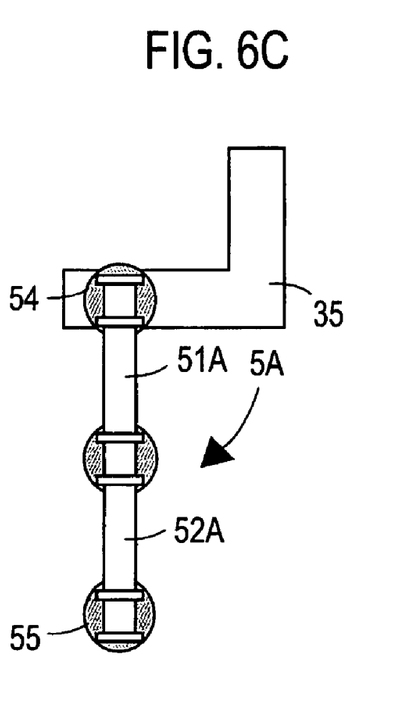
FIG. 6C is a side view showing the second example of the ball joint (showing the state where the rubber balls constituting the ball portions are fitted, and illustrating the cross sections of the rubber balls).
Figure 6D:
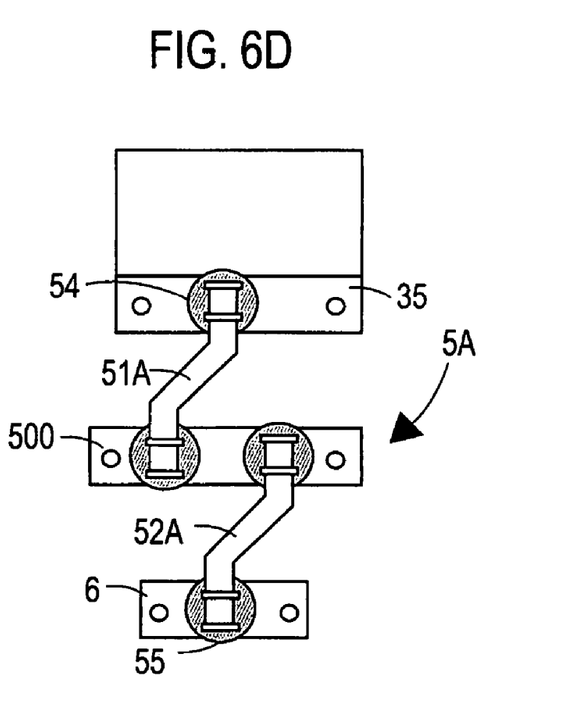
FIG. 6D is a front view showing the second example of the ball joint (showing a state where the rubber balls constituting the ball portions are fitted, and illustrating the cross sections of the rubber balls).
Figure 7A:
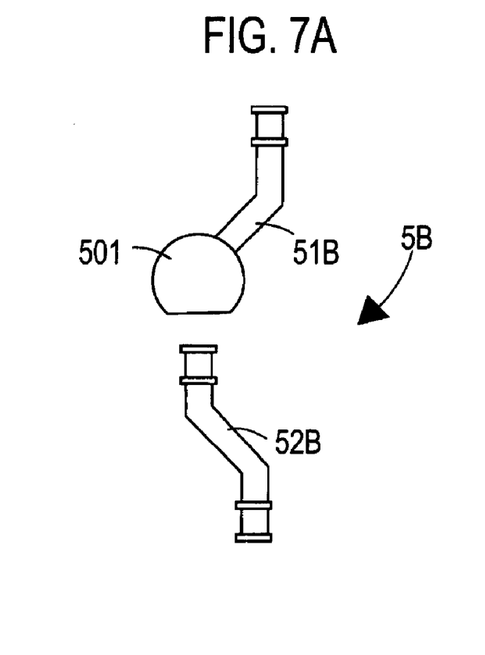
FIG. 7A is a plan view showing a third example of the ball joint (showing a state with a first bent portion being separated from second bent portion, and a state with the rubber balls constituting the ball portions, of the second bent portion being removed).
Figure 7B:
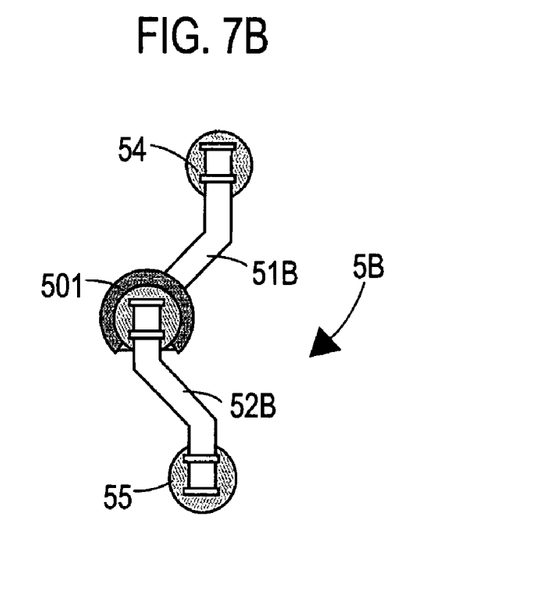
FIG. 7B is a second plan view showing the third example of the ball joint (showing a state where the rubber balls constituting the ball portions are fitted, and illustrating the cross sections of the rubber balls and the connecting portions).
Figure 7C:
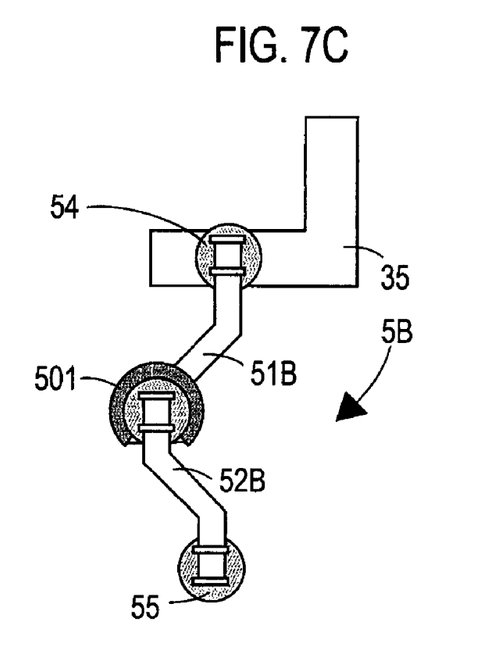
FIG. 7C is a third plan view showing the third example of the ball joint (showing a state where the ball joint is fitted to a supporting block 35).
Figure 7D:
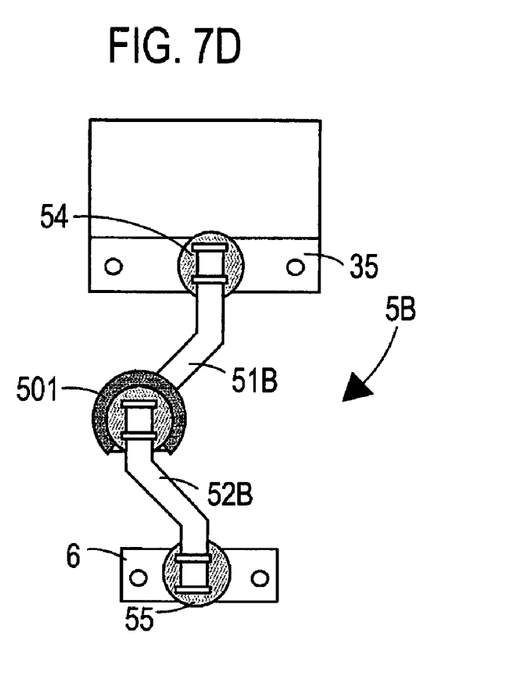
FIG. 7D is a fourth plan view showing the third example of the ball joint (showing a state where the ball joint is fitted to the supporting block 35 and to a supporting block 6).

FIGS. 5A and 5B briefly show a state where the image providing apparatus is fitted to the observer A. Relative positions between the optical housing 4 and the headset 3 can be changed by use of the ball joint 5. Moreover, in the case of the image providing apparatus 1, it is possible to adjust the distance between the ball portion 54 and the ball portion 55 by changing the angle (θ) defined by the first bent member 51 and the second bent member 52 at the time of adjusting the length of the eye relief. Accordingly, it is possible to align the center of the optical axis of the optical housing with the center of the pupil.

FIGS. 6A, 6B, 6C and 6D are explanatory views showing a ball joint 5A, and representing another example of the ball joint 5. A first bent member 51A and a second bent member 52A have the same shape. Ball portions are formed on the respective two ends of each bent member. Specifically, the first bent member 51A includes another ball portion in addition to the ball portion 54. Similarly, the second bent member 52A includes another ball portion in addition to the ball portion 55. These additional ball portions are respectively mounted on mutually different positions of an intermediate connecting member 500 so as to have ranges of conical movements, and to be capable of maintaining the posture thereof. The intermediate connecting member 500 consists of two divided blocks, and two semispherical dents are formed on each divided block. Two spaces for containing the ball portions are defined by coupling the semispherical dents on the two divided blocks. The ball portions are housed in the spaces, and then the two divided blocks are screwed together. The intermediate connecting member 500 may contain resin, light metal, or the like as a major ingredient.

FIGS. 7A, 7B, 7C and 7D are explanatory views showing a ball joint 5B as another example of the ball joint 5. The ball portion 54 is formed on one end thereof, and a hollow member 501 having a spherical hollow on the other end thereof. A second bent member 52B is provided with another ball portion in addition to the ball-portion 55. The additional ball portion is inserted to the hollow member 501, and is then connected to the first and second bent members 51B and 52B. Thereby, the additional ball portion is fitted so as to allow the first and second bent members 51B and 52B to have a conical-movable range and to be capable of maintaining the postures thereof. The hollow member 501 may contain resin, light metal or the like as a major ingredient.

Figure 8:
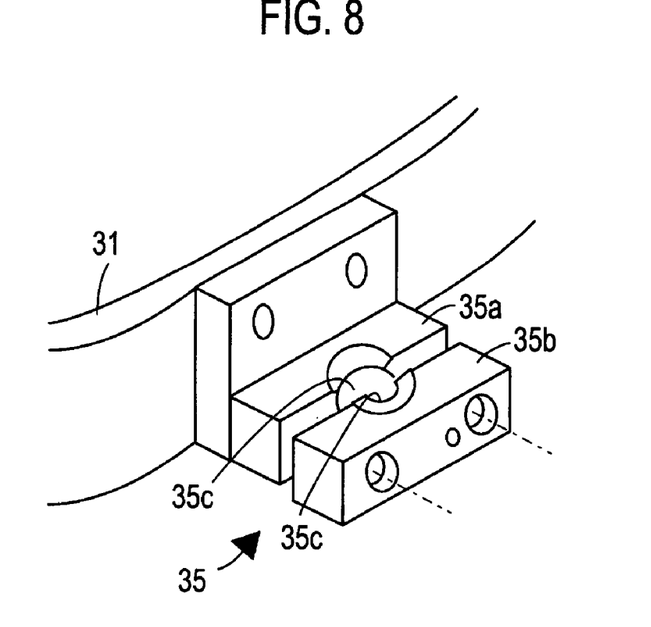
FIG. 8 is a perspective view showing a supporting member provided to a headset and a supporting block attached to this supporting member.
Figure 9A:
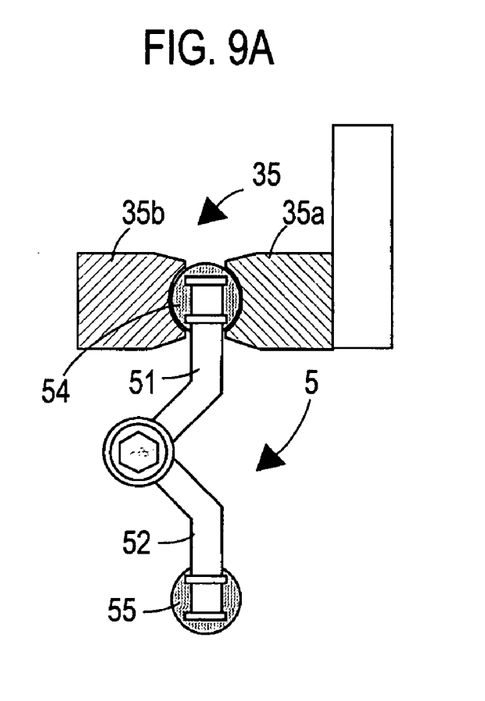
FIG. 9A is a front view showing a state where the ball joint is fitted to the supporting block, and illustrating a cross section of a block portion.
Figure 9B:
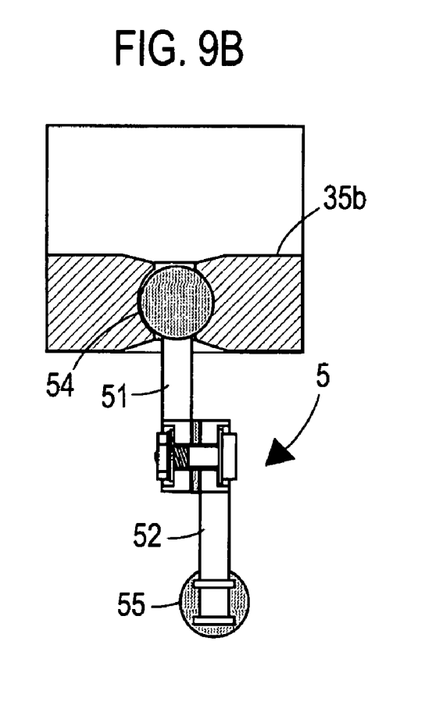
FIG. 9B is a side view showing the state where the ball joint is fitted to the supporting block, and illustrating the cross section of the block portion.

FIG. 8 is a perspective view showing the supporting member 31 provided to the headset 3 and a supporting block 35 fitted to this supporting member 31. FIGS. 9A and 9B are longitudinal cross-sectional views showing a state where the ball joint 5 is fitted to the supporting block 35. The supporting block 35 includes two divided blocks 35a and 35b, and semispherical dents 35c are respectively formed thereon. A space for containing the ball portion 54 is defined by coupling the semispherical dents 35c formed in the respective two divided blocks 35a and 35b. Two screw holes are formed on each of the divided blocks 35a and 35b, and the divided blocks 35a and 35b are fixed to each other by screws that are inserted to these screw holes. The supporting block 35 may contain resin, light metal or the like as a major ingredient.

Figure 10:
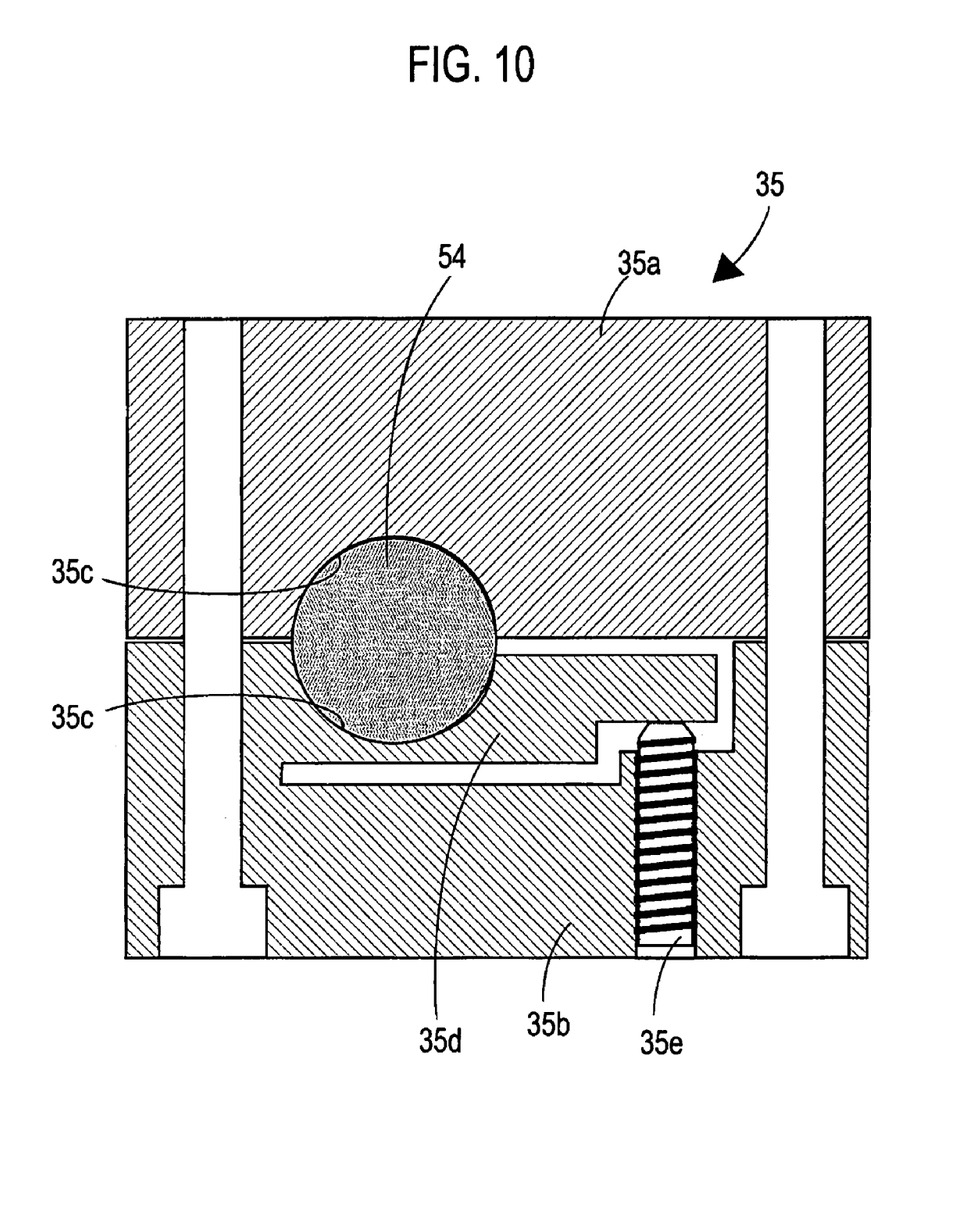
FIG. 10 is a transverse sectional view of the supporting block (on the supporting member side).

FIG. 10 is a transverse cross-sectional view of the supporting block 35. A flexible piece 35d is provided to the central portion of the rear surface of the divided block 35b. Part of the divided block 35b constitutes the flexible piece 35d by providing a slit in the divided block 35b. Moreover, the dent 35c is formed in this flexible piece 35d. Meanwhile, there is a clearance between the flexible piece 35d and a side face of the divided block 35a, facing the flexible piece 35d. The ball portion 54 which is provided so as to be capable of maintaining the posture thereof on the supporting block 35 side is in contact with the flexible piece 35d (the dent 35c). In addition, a screw 35e is engaged with the divided block 35b. A tip end of the screw 35e is in contact with the flexible piece 35d. The degree of pressure from the flexible piece 35d against the ball portion 54 is changed by the degree of pressure caused by the screw 35e. Even if the pressure is loosened due to aging, it is possible to maintain the optimum pressure by eliminating such loosening by use of the screw 35e.

Figure 11A:
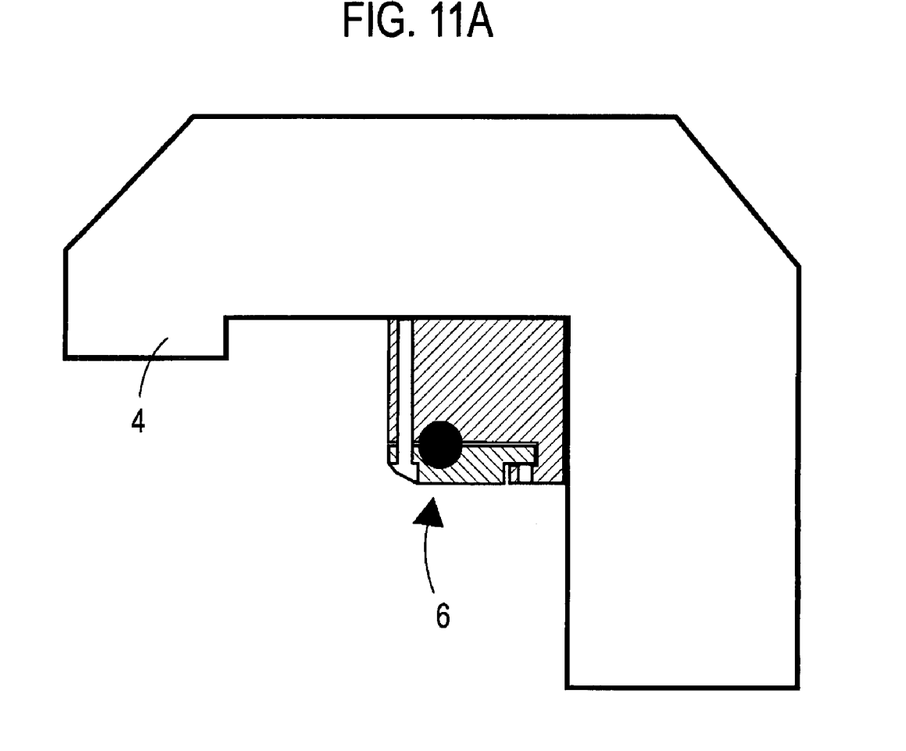
FIG. 11A is a view showing the supporting block (on the optical housing side), and showing the entire optical housing (illustrating the cross section of the supporting block).
Figure 11B:
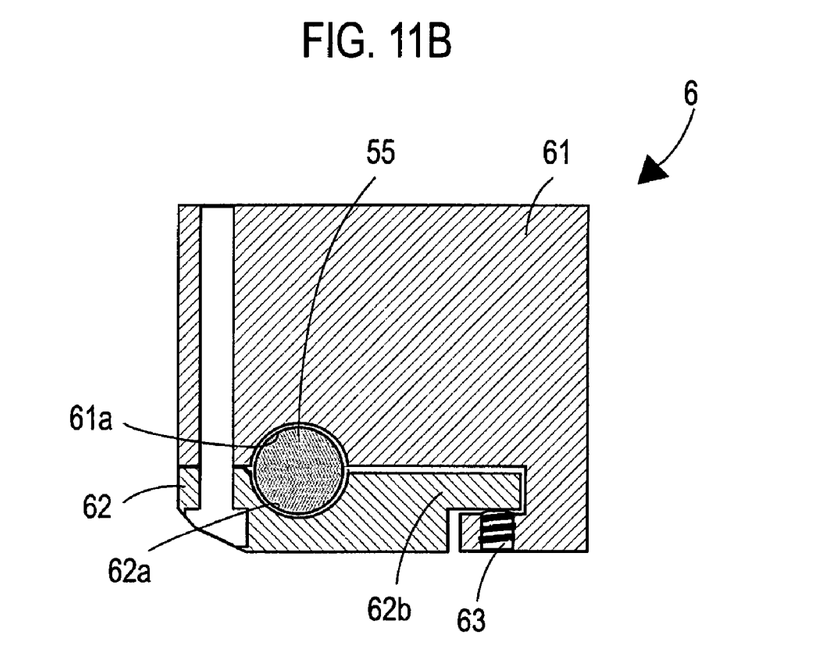
FIG. 11B is an enlarged cross-sectional view showing the supporting block (on the optical housing side).

FIGS. 11A and 11B are transverse cross-sectional views showing a supporting block 6 provided to the optical housing 4. The supporting block 6 is composed of two divided blocks 61 and 62, and semispherical dents 61a and 62a are respectively formed thereon. A space for containing the ball portion 55 is defined by coupling the semispherical dents 61a and 62a in the two divided blocks 61 and 62. One screw hole is formed on the left side, in the drawings, of the divided blocks 61 and 62. Thereby, the divided blocks 35a and 35b are fixed to each other by a screw that is inserted to this single screw hole. The supporting block 6 may contain resin, light metal or the like as a major ingredient.

The left side of the divided block 62 in the drawing is fixed with the single screw while the right side thereof is a free end, or namely a flexible piece 62b. There is a clearance between this flexible piece 62b and a side face of the divided block 61, facing the flexible piece 62b. The ball portion 55 contacts the flexible piece 62b (the dent 62a). In addition, a right-end portion, in the drawing, of the divided block 61 protrudes around to cover the front portion of the flexible piece 62b. A screw hole is formed on this protruded portion. A screw 63 is engaged with this screw hole. A tip end of the screw 63 is in contact with the flexible piece 62b. The degree of pressure from the flexible piece 62b against the ball portion 55 is changed by the degree of pressure caused by the screw 63. Even if the pressure is loosened due to aging, it is possible to maintain the optimum pressure by eliminating such loosening by use of the screw 63. The divided block 61 is formed into a shape with which the strength of the engaged portion of the screw 63 can be maintained in a case where the large portion of the divided block 61 is in contact with the optical housing 4. The structure of the supporting block 6 is more simplified than the supporting block 35.

Here, the supporting blocks 35 may be formed in two horizontally symmetrical positions of the supporting member 31 so that the optical housing 4 can be fitted to a location for the right eye or to a location for the left eye. It is needless to say that two optical housings 4 may be provided respectively for two eyes. The observer can see a three-dimensional image by providing parallax images from the two optical housings 4. Moreover, the image providing apparatus is not limited to the configuration which allows the observer to observe an image by the Maxwellian view. Instead of the supporting block 6, the supporting block 35 may be used as the supporting member for the optical housing 4.

According to the above-described configuration, it is made possible to change the angle defined by the first bent member and the second bent member. By adjusting this angle, the distance between the two ball portions can be adjusted. Moreover, by this distance adjustment, it is possible to adjust displacement of the optical housing in the vertical direction to the eyeball of the observer even when adjusting the eye-relief of the optical housing to the eyeball of the observer. Moreover, since the rod member includes the first bent member and the second bent member, it is possible to adjust the distance between the ball portions within the wider conical-movable range than that of a rod member formed of straight components.

It is preferable that a surface of the ball portion contains a rubber material as a major ingredient in the embodiment.

It is preferable that each of the first member and the second member includes a connecting portion, and the first member and the second member are connected to each other by pressure while having a rubber material therebetween.

It is preferable that the first member and the second member respectively include ball portions each constituting a connecting portion, and the ball portions are respectively connected to different locations on an intermediate connecting member. Also it is preferable that one of the first member and the second member includes a ball portion constituting a connecting portion on one end thereof, the other member includes a hollow member having a spherical hollow on one end thereof, and the ball portion is fitted and connected to the hollow member.

It is preferable that the supporting member is provided with a flexible piece, the ball portion provided to the supporting member side, as being capable of maintaining the posture thereof, is in contact with the flexible piece, and the flexible piece changes the degree of pressure against the ball portion according to the degree of pressure caused by a screw.

It is preferable that the optical housing is provided with a flexible piece, the ball portion provided to the optical housing side, as being capable of maintaining the posture thereof, is in contact with the flexible piece, and the flexible piece changes the degree of pressure against the ball portion according to the degree of pressure caused by a screw.

According to the image providing apparatus of the embodiment, it is made possible to adjust displacement of the optical housing in the vertical direction to the eyeball of the observer even when adjusting the eye-relief of the optical housing to the eyeball of the observer.

What is claimed is:

1. An image providing apparatus comprising:
    an optical housing which houses an image providing optical system for providing an image to an observer;
    a head gear which is fitted to a head of the observer;
    a supporting member provided to the head gear; and
    a connecting member which connects the supporting member and the optical housing, wherein
    the connecting member includes ball portions respectively on two ends thereof, and has a conical-movable range,
    the ball portion on a first one of the ends is provided to the supporting member side, as being capable of maintaining a posture thereof,
    the ball portion on the second one of the ends is provided to the optical housing side, as being capable of maintaining a posture thereof,
    the connecting member includes a first member and a second member, and the first member is connected to the second member so as to be movable and capable of maintaining a posture thereof.

2. The image providing apparatus as claimed in claim 1, wherein a surface of the ball portion contains a rubber material as a major ingredient.

3. The image providing apparatus as claimed in claim 1, wherein
    each of the first member and the second member includes a connecting portion, and
    the first member and the second member are connected to each other by pressure while having a rubber material therebetween.

4. The image providing apparatus as claimed in claim 1, wherein
    one of the first member and the second member includes a ball portion constituting a connecting portion on one end thereof,
    the other member includes a hollow member having a spherical hollow on one end thereof, and
    the ball portion is fitted and connected to the hollow member.

5. The image providing apparatus as claimed in claim 1, wherein
    the supporting member is provided with a flexible piece,
    the ball portion provided to the supporting member side, as being capable of maintaining the posture thereof, is in contact with the flexible piece, and
    the flexible piece changes the degree of pressure against the ball portion according to the degree of pressure caused by a screw.

6. The image providing apparatus as claimed in claim 1, wherein
    the optical housing is provided with a flexible piece,
    the ball portion provided to the optical housing side, as being capable of maintaining the posture thereof, is in contact with the flexible piece, and
    the flexible piece changes the degree of pressure against the ball portion according to the degree of pressure caused by a screw.

7. The image providing apparatus as claimed in claim 1, wherein at least one of the first member and the second member is formed into a bent shape.

8. The image providing apparatus as claimed in claim 1, wherein
    the ball portion on the first end is provided to the first member as being capable of maintaining the posture thereof against the supporting member,
    a first end of the second member is provided as being capable of maintaining the posture thereof against the first member, and
    the ball portion on the second end of the second member is provided to the optical housing side, as being capable of maintaining the posture thereof.

9. The image providing apparatus as claimed in claim 1, wherein each of the first member and the second member includes ball portions respectively on two ends thereof.

10. The image providing apparatus as claimed in claim 9, further comprising an intermediate connecting member provided as being capable of maintaining a posture thereof against the ball portion on the second end of the first member and against the ball portion on the first end of the second member.

11. The image providing apparatus as claimed in claim 1, wherein
    the first member and the second member respectively include ball portions each constituting a connecting portion, and
    the ball portions are respectively connected to different locations on an intermediate connecting member.

12. The image providing apparatus as claimed in claim 11, wherein a surface of the ball portion contains a rubber material as a major ingredient.

* * * * *